US011068394B2

(12) United States Patent
Yang et al.

(10) Patent No.: US 11,068,394 B2
(45) Date of Patent: Jul. 20, 2021

(54) NEURAL NETWORK SYSTEM INCLUDING DATA MOVING CONTROLLER

(71) Applicant: Electronics and Telecommunications Research Institute, Daejeon (KR)

(72) Inventors: Jeongmin Yang, Busan (KR); Young-Su Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 47 days.

(21) Appl. No.: 16/567,241

(22) Filed: Sep. 11, 2019

(65) Prior Publication Data

US 2020/0133854 A1 Apr. 30, 2020

(30) Foreign Application Priority Data

Oct. 29, 2018 (KR) .................. 10-2018-0130226
Apr. 4, 2019 (KR) .................. 10-2019-0039824

(51) Int. Cl.
*G06F 12/06* (2006.01)
*G06F 17/16* (2006.01)
*G06N 3/063* (2006.01)

(52) U.S. Cl.
CPC .......... *G06F 12/0653* (2013.01); *G06F 17/16* (2013.01); *G06N 3/063* (2013.01); *G06F 2212/251* (2013.01)

(58) Field of Classification Search
CPC ...... G06F 12/0653; G06F 3/061; G06F 17/16; G06F 13/1668; G06F 13/385; G06F 13/387; G06F 2212/251; G11C 11/4096; G11C 7/1006; G06N 3/063
See application file for complete search history.

(56) References Cited

U.S. PATENT DOCUMENTS

| | | | |
|---|---|---|---|
| 9,665,799 B1 | 5/2017 | Munteanu et al. | |
| 9,684,592 B2 | 6/2017 | Anderson | |
| 9,697,820 B2 | 7/2017 | Jeon | |
| 9,952,831 B1 * | 4/2018 | Ross | G11C 8/04 |
| 2009/0254694 A1 * | 10/2009 | Ehrman | G11C 7/1006 |
| | | | 711/100 |
| 2010/0017450 A1 * | 1/2010 | Sun | G06F 9/30036 |
| | | | 708/401 |
| 2018/0189643 A1 * | 7/2018 | Kim | G06F 17/153 |
| 2019/0311242 A1 * | 10/2019 | Chen | G06N 3/02 |

FOREIGN PATENT DOCUMENTS

KR 10-2018-0123846 A 11/2018

* cited by examiner

*Primary Examiner* — Charles Rones
*Assistant Examiner* — Hewy H Li
(74) *Attorney, Agent, or Firm* — Rabin & Berdo, P.C.

(57) ABSTRACT

Provided is a neural network system for processing data transferred from an external memory. The neural network system includes an internal memory storing input data transferred from the external memory, an operator performing a multidimensional matrix operation by using the input data of the internal memory and transferring a result of the multidimensional array operation as output data to the internal memory, and a data moving controller controlling an exchange of the input data or the output data between the external memory and the internal memory. The data moving controller reorders a dimension order with respect to an access address of the external memory to generate an access address of the internal memory, for the multidimensional matrix operation.

11 Claims, 6 Drawing Sheets

NEURAL NETWORK SYSTEM INCLUDING DATA MOVING CONTROLLER

CROSS-REFERENCE TO RELATED APPLICATIONS

This U.S. non-provisional patent application claims priority under 35 U.S.C. § 119 of Korean Patent Application Nos. 10-2018-0130226, filed on Oct. 29, 2018, and 10-2019-0039824, filed on Apr. 4, 2019, respectively, the entire contents of which are hereby incorporated by reference.

BACKGROUND

Embodiments of the inventive concept relate to a neural network system, and more particularly, to a data moving controller for a neural network accelerator.

Artificial Intelligence (hereinafter, referred to as an "AI") semiconductor design technologies which mimic a human brain have been developing with decades of history. However, the AI semiconductor design technologies have stagnated due to limitations in the amount of computation of silicon-based semiconductors. The neural network which models neuron's neurotransmission through a process of learning weights of input values has not been spotlighted due to limitations of semiconductor technologies. However, in recent years, as semiconductor processes are continuously miniaturized and advanced, the AI semiconductor design technologies and neural network models have been attracting attention again.

AI semiconductors may implement thinking, reasoning, behavior, and operation optimized for specific services by using a large amount of input information. As the concept of a Multi-Layer Perceptron (MLP) and a neural network circuit is introduced into the AI semiconductor technologies, application fields of the AI technologies are being segmented and diversified.

To improve performance, AI computers may utilize distributed computing techniques which are based on a large number of Central Processing Units (CPUs) and Graphic Processing Units (GPUs). However, the increase in the amount of computation required for AI computing is out of the range of the amount of computation that can be processed by the CPU- and GPU-based architecture. AI to which a deep learning is applied requires about 1000 times more performance than current mobile processors. Since products manufactured to obtain such performance consume power of several kilowatts (KW) or more, it is difficult to commercialize the products. Furthermore, semiconductor devices are currently facing physical limitations on process scaling.

Accordingly, despite the above limitations, there is an urgent demand on technologies capable of improving the performance of AI computers.

SUMMARY

Embodiments of the inventive concept provide a neural network system including a data moving controller that is applied to a neural network accelerator processing multidimensional matrix data of the neural network accelerator.

According to an exemplary embodiment, a neural network system processes data transferred from an external memory. The neural network system includes an internal memory storing input data transferred from the external memory, an operator performing a multidimensional matrix multiplication operation by using the input data of the internal memory and transferring a result of the multidimensional array multiplication to the internal memory as output data, and a data moving controller controlling an exchange of the input data or the output data between the external memory and the internal memory. The data moving controller, for the multidimensional matrix multiplication operation, reorders a dimension order with respect to an access address of the external memory to generate an access address of the internal memory.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Embodiments of the inventive concept will be described below in more detail so that those skilled in the art can easily carry out the inventive concept.

Figure 1:
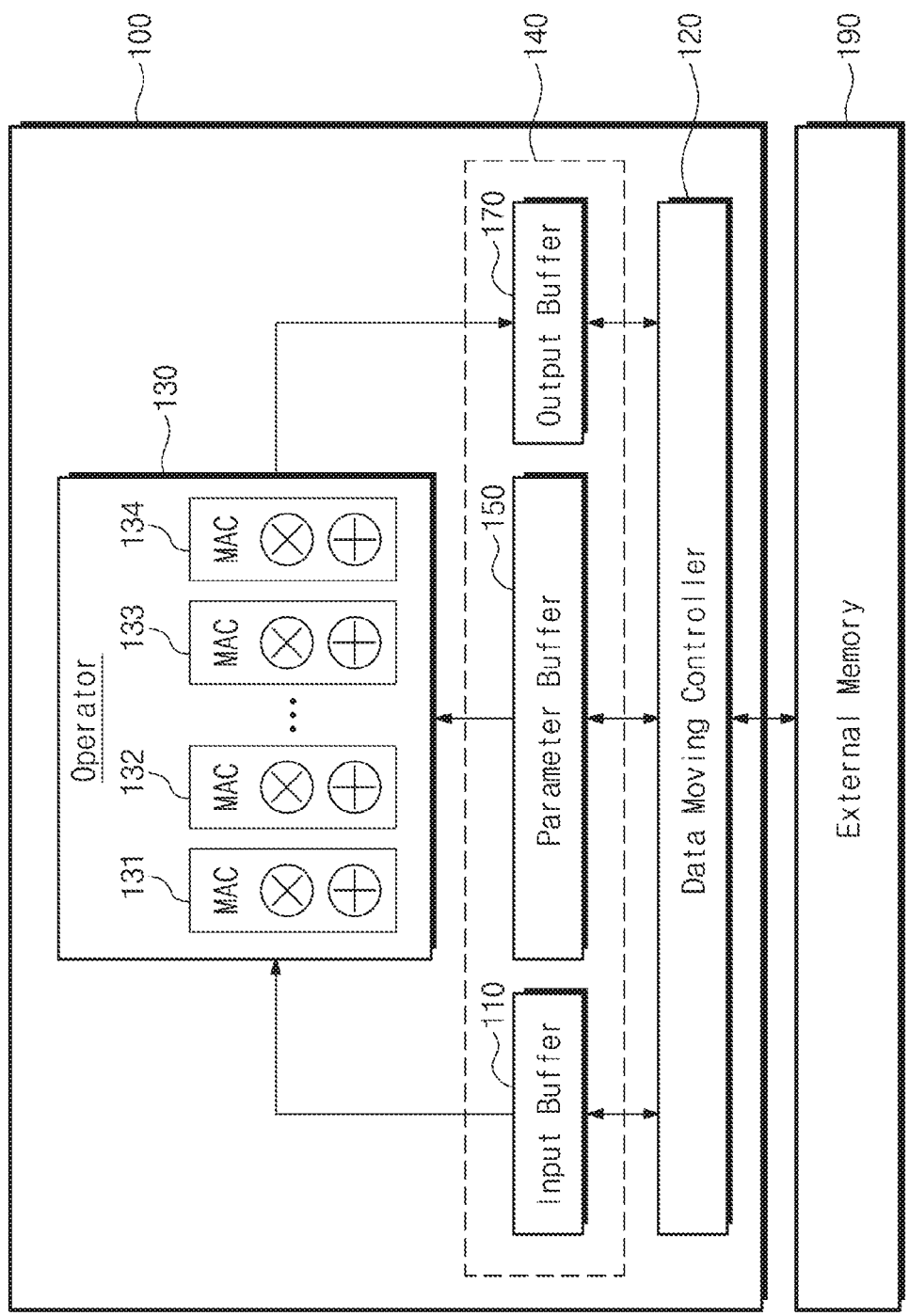
FIG. 1 is a block diagram illustrating a neural network system according to an embodiment of the inventive concept.

FIG. 1 is a block diagram illustrating a neural network system according to an embodiment of the inventive concept. Referring to FIG. 1, a neural network system 100 may process input data provided from an external memory 190 to generate output data. The neural network system 100 may be, for example, a Convolutional Neural Network (CNN) system.

The input data which is provided from the external memory 190 to the neural network system 100 may be, for example, image data. In detail, the input data may be a still image or a moving image provided through an image sensor. The input data may be an image transferred through a wired or wireless communication means. The input data may be provided in the form of a multidimensional array of digitized image data. The input data may be sample images or kernel data provided for training of the neural network system 100. The output data may be a result value obtained by processing the input data through the neural network system 100. The output data may also be a result value obtained by determining images that are input in a learning operation or an estimation operation of the neural network system 100. The output data may be a pattern or identification information which the neural network system 100 detects from the input data.

The neural network system 100 includes a data moving controller 120, an operator 130, and an internal memory 140.

In this case, the internal memory 140 may include an input buffer 110, a parameter buffer 150, and an output buffer 170.

Data values of the input data are loaded in the input buffer 110. A size of the input buffer 110 may vary depending on a size of the kernel for a convolution operation. For example, when the size of the kernel is K×K, input data of a magnitude enough for the operator 130 to sequentially perform a convolution operation with the kernel will have to be loaded in the input buffer 110. The loading of the input data into the input buffer 110 may be controlled by the data moving controller 120.

The operator 130 may perform the convolution operation or a pooling operation by using the input buffer 110, the parameter buffer 150, and the output buffer 170. The operator 130 may perform, for example, the convolution operation in which multiplication and addition are repeatedly processed on the kernel and the input data. The operator 130 may include parallel processing cores for processing a plurality of convolution operations in parallel.

The kernel may be provided through the input buffer 110, for example. Kernelling refers to a process of the convolution operation. The process of the convolution operation includes multiplying all data values, which overlap the kernel, of the input data and the kernel together, and summing results of the multiplication. Each of kernels may be regarded as a specific feature identifier. Such kernelling will be performed on the input data and kernels corresponding to various feature identifiers. The procedure in which the kernelling is performed by using various kernels may be performed in the convolution layer, and feature maps may be generated as a result of performing the procedure.

The operator 130 may perform down-sampling on the feature maps generated through the convolution operation. Since the size of the feature maps generated by the convolution operation is relatively large, the operator 130 may perform pooling to reduce the size of the feature maps. A result value of each convolution operation or each pooling operation is stored in the output buffer 170, and may be updated when the number of convolution loops increases and when the pooling operation is performed. The operator 130 may include a plurality of cores 131, 132, . . . , and 134 for processing convolution operations or multidimensional matrix multiplication operations in parallel. The operator 130 may perform the convolution operations on the kernel provided from the parameter buffer 150 and an input feature segment stored in the input buffer 110 in parallel.

The parameter buffer 150 may provide parameters necessary for the convolution operation, a bias addition operation, a Rectified Linear Units (ReLU), and the pooling operation, which are performed in the operator 130. The parameters learned in a learning phase may be stored in the parameter buffer 150.

Result value of the kernelling or the pooling executed by the operator 130 is loaded into the output buffer 170. The result value loaded into the output buffer 170 are updated depending on a result that the convolution is executed for an each of convolution loops by using a plurality of kernels.

The data moving controller 120 may move the kernel data and the input data (for example, image data) stored in the external memory 190 into the internal memory 140 when the convolution operation is performed on various layers of the neural network by the operator 130. The data moving controller 120 may move the output data, which is output as a result of the operation performed by the operator 130, from the internal memory 140 to the external memory 190. For example, the external memory 190 may include a Double Data Rate (DDR) Dynamic Random Access Memory (DRAM) coupled to an Advanced eXtensible Interface (AXI) bus. The internal memory 140 may include a Static Random Access Memory (SRAM) or a Scratch Pad Memory (SPM).

The data moving controller 120 performs a control operation for accelerating the multidimensional matrix multiplication operation or the convolution operation performed through the operator 130. For example, the data moving controller 120 may reconstruct a dimensional array with regard to the multidimensional matrix of the input data to allow the operator 130 to perform efficient processing. To this end, the data moving controller 120 may generate a physical address for the input data. This will be described in detail with reference to FIG. 3.

The configurations and functions of the neural network system 100 of the inventive concept are described above. The speed and efficiency of the multidimensional matrix multiplication operation or the convolution operation of the neural network system 100 may be markedly improved through the operation of the data moving controller 120 of the inventive concept.

Figure 2:
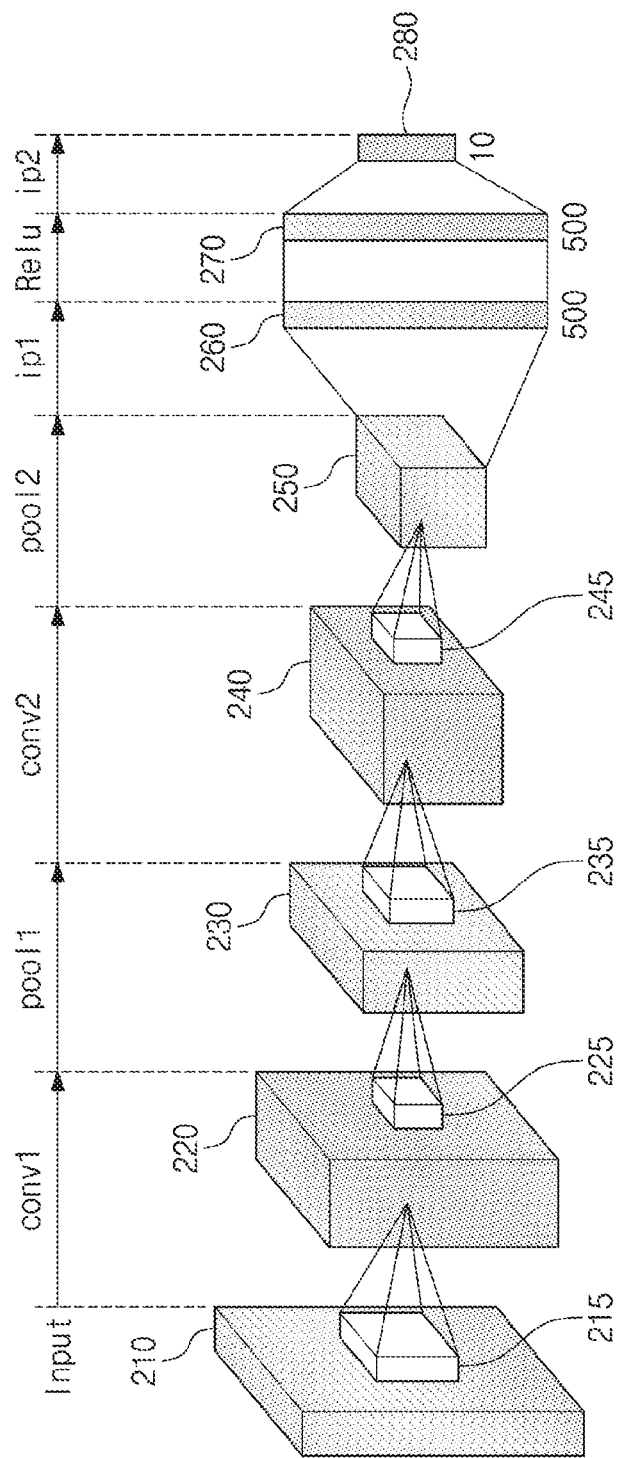
FIG. 2 is a diagram illustrating layers of a convolutional neural network according to an embodiment of the inventive concept.

FIG. 2 is a diagram illustrating layers of a convolutional neural network according to an embodiment of the inventive concept. Referring to FIG. 2, layers of a convolutional neural network for processing an input feature 210 are illustrated.

In the convolution operation or the pooling operation performed in procedure such as a learning or an object recognition, in an activation operation, and in a fully connected layer operation, an enormous number of parameters may be entered and updated. The input feature 210 is processed in a first convolution layer conv1 and in a first pooling layer pool1 at which a result processed through the first convolution layer conv1 is down-sampled. When the input feature 210 is provided, the first convolution layer conv1, which first performs the convolution operation on a kernel 215, is applied. In detail, data of the input feature 210 overlapping the kernel 215 is multiplied by data defined in the kernel 215. All the multiplied values may be summed to generate a single feature value. The single feature value may form one point in a first feature map 220. Such the convolution operation will be repeatedly performed while the kernel 215 is sequentially shifted.

The convolution operation for one input feature 210 is performed with regard to a plurality of kernels. The first feature map 220 which has an array form corresponding to each of the plurality of channels may be generated based on the application of the first convolution layer conv1. For example, when four kernels are used, the first feature map 220 having four channels may be generated.

Subsequently, when the execution of the first convolution layer conv1 is completed, the down-sampling is performed to reduce the size of the first feature map 220. The data of the first feature map 220 may have a size which is burdensome in processing depending on the number of kernels or the size of the input feature 210. Accordingly, in the first pooling layer pool 1, the down-sampling (or sub-sampling) is performed to reduce the size of the first feature map 220 within a range that does not significantly affect a result of the operation. A typical operation method of the down-sampling is the pooling. While a filter to perform the down-sampling is slid with a predetermined stride in the first feature map 220, a maximum value or an average value in a corresponding region may be selected. The case of selecting the maximum value is referred to as a "maximum pooling", and the method of outputting the average value is referred to as an "average pooling". A second feature map 230 may have a reduced size than the size of the first feature map 220, through the down-sampling of the first pooling layer pool1.

In some cases, the convolution layer in which the convolution operation is performed and the pooling layer in which the down-sampling operation is performed may be repeatedly provided. In detail, as illustrated in FIG. 2, operations of a second convolution layer conv2 and operations of a second pooling layer pool2 may be performed. A third feature map 240 may be generated through the second convolution layer conv2, and a fourth feature map 250 may be generated by the second pooling layer pool2. Fully connected layers ip1 and ip2 and an activation layer Relu cause the fourth feature map 250 to be generated as fully connected features 260 and 270 and an output feature 280, respectively. Although not illustrated in FIG. 2, the bias addition operation or the activation operation may be added between the convolution layer and the pooling layer.

As described above, the output feature 280 is generated by processing the input feature 210 in the convolution neural network. In the learning of the convolution neural network, an error backpropagation algorithm may be used. The error backpropagation algorithm propagates the error of the weight backwards so as to significantly reduce a difference between a result value of this operation and an expected value. In the learning operation, an operation for finding an optimal solution may be repeated by using a gradient descent technique. The gradient descent technique may significantly reduce the error with regard to learning parameters of each layer belonging to the convolutional neural network (CNN).

To perform the operations described above, the input feature 210, the feature maps 220, 230, 240, and 250, or the kernels 215, 225, 235, and 245, which are corresponding to the input data may be transferred from the external memory 190 to the internal memory 140. However, a dimension order of these data of the form of the multidimensional matrix may be reordered by the data moving controller 120 of the inventive concept during the data transfer process. For example, the data moving controller 120 reorders the physical address for reading the input data from the external memory 190 or the physical address for writing the input data in the internal memory 140.

Figure 3:
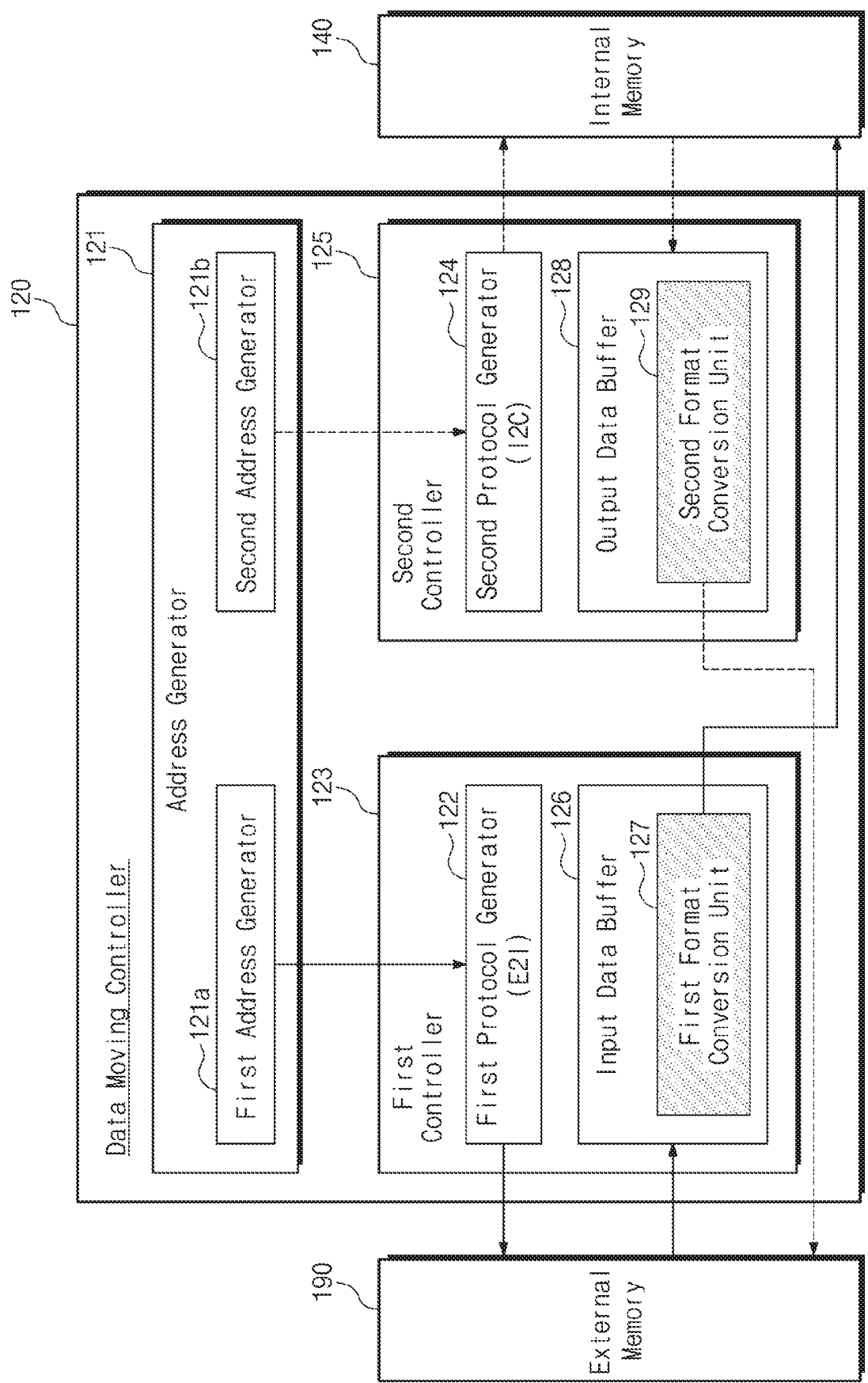
FIG. 3 is a block diagram illustrating a data moving controller for a neural network accelerator according to an embodiment of the inventive concept.

FIG. 3 is a block diagram illustrating a data moving controller for a neural network accelerator according to an embodiment of the inventive concept. Referring to FIG. 3, the data moving controller 120 may include an address generator 121, a first controller 123, and a second controller 125.

The address generator 121 generates the physical address for accessing the internal memory 140 and the external memory 190. The address generator 121 may include a first address generator 121*a* and a second address generator 121*b*.

The first address generator 121*a* may generate the physical address for accessing the external memory 190. The input data, which are transferred from the external memory 190 to the internal memory 140, such as the kernel data or the input image, are provided in the form of the multidimensional matrix. Therefore, to read the input data of the form of the multidimensional matrix from the external memory 190, the first address generator 121*a* may generate a read address of the external memory 190 by executing multiple nested loops of the number of dimensions of the matrix or greater. In addition, the first address generator 121*a* may generate a write address for transferring the output data read from the internal memory 140 to the external memory 190.

The second address generator 121*b* generates the physical address for accessing the internal memory 140. The second address generator 121*b* generates a write address for storing the kernel data or the input image in the internal memory 140. The kernel data or the input image may be provided in the form of the multidimensional matrix from the external memory 190. The second address generator 121*b* generates a read address for reading the output data, which are provided in the form of the multidimensional matrix, from the internal memory 140.

In general, data which are exchanged between the external memory 190 and the internal memory 140 are provided in the form of the multidimensional matrix. Accordingly, to read the data in the form of the multidimensional matrix from the external memory 190, the first address generator 121*a* may execute the multiple nested loops of the number of dimensions of the matrix or greater and may generate the read address. In addition, to write the output data transferred from the internal memory 140 to the external memory 190, the first address generator 121*a* may generate the write address by executing the multiple nested loops of the number of dimensions of the matrix or greater.

When the data of the form of the multidimensional matrix are stored in the internal memory 140, it is necessary to reorder the data such that the convolution operation or the multidimensional matrix multiplication operation is efficiently performed. In detail, the size of data transferred from the external memory 190 to the internal memory 140 does not change, but the array or the dimension order is changed. Accordingly, the second address generator 121*b* generates the physical addresses of the external memory 190 or the internal memory 140, to reorder the multidimensional matrix data. In this case, the array which has the multidimensional matrix with regard to the input data provided from the external memory 190 is referred to as a "first multidimensional array", and the array which has the multidimensional matrix with regard to the data stored in the internal memory 140 is referred to as a "second multidimensional array".

The output data which are transferred from the internal memory 140 to the external memory 190 may include results of the multidimensional matrix operation or the learned parameters. The output data has a form of the second multidimensional array having the dimension order obtained by changing the dimension order of the input data. However, to transfer the output data of the second multidimensional array to the external memory 190, the output data is required to be reordered to have the first multidimensional array input firstly. Thus, to read the output data of the second multidimensional array from the internal memory 140, the second address generator 121*b* may execute the multiple nested loops of the number of dimensions of the matrix or greater to generate the read address. Also, to write the output data of the second multidimensional array read from the internal memory 140 into the external memory 190, the first address generator 121*a* may generate the write address for reordering the output data of the second multidimensional array into the data of the first multidimensional array.

The first controller 123 processes a data transfer from the external memory 190 to the internal memory 140 by using the address which is provided from the first address generator 121*a*. The first controller 123 may include a first protocol generator 122 for processing the data transfer from the external memory 190 to the internal memory 140, and may include an input data buffer 126.

The first protocol generator 122 may generate a protocol corresponding to each of the memories 140 and 190 for the data transfer from the external memory 190 to the internal memory 140. For example, the external memory 190 may include a DDR DRAM that exchanges data through the AXI-based bus, and the internal memory 140 may include an SRAM. In this case, the read address may be transmitted through the AXI-based bus to access data in an area of the external memory 190 corresponding to the address generated from the first address generator 121*a*. The input data read from the external memory 190 of the corresponding address is stored in the input data buffer 126 of the first controller 123. Then, a format of the data input by a first format conversion unit 127 is changed, and the format-changed data may be written to an area of the internal memory 140 which corresponds to the address generated from the second address generator 121*b*.

The input data buffer 126 may be configured to store data input from the external memory 190. The time at which data is stored may depend on a situation of the bus. When a format of data input from the outside is different from a format of data used in the internal memory 140, the first format conversion unit 127 may be configured to change the format of data input from the outside. The first format conversion unit 127 may include at least one of a floating point operator and a fixed point operator. For example, the first format conversion unit 127 may change the format of data, based on IEEE 754-2008 (IEEE Standard for Floating-Point Arithmetic). The first format conversion unit 127 may support a format conversion of a floating-point, a single-to-half, a half-to-single, a single-to-double, a double-to-single, a floating-to-integer, an integer-to-floating, and so on.

The data transfer from the internal memory 140 to the external memory 190 may be performed through the second controller 125. The second controller 125 may include a second protocol generator 124, and an output data buffer 128. The output data buffer 128 may include a second format conversion unit 129.

To transfer data from the internal memory 140 to the external memory 190, the second protocol generator 124 may generate a protocol corresponding to each of the memories 140 and 190. It is assumed that the external memory 190 includes the AXI-based DDR DRAM, and the internal memory 140 includes the SRAM. Data read from an area of the internal memory 140 which corresponds to the read address generated by the second address generator 121*b* may be then stored in the output data buffer 128. To access a memory area of the external memory 190 corresponding to the write address generated by the first address generator 121*a*, the write address may be transmitted through the AXI bus. When a status of the external memory 190 is in a ready state, the format of the data stored in the output data buffer 128 is changed by the second format conversion unit 129. Data of which the format is changed will be written in a target area of the external memory 190 corresponding to the write address generated by the first address generator 121*a*.

The output data buffer 128 may be configured to store data input from the internal memory 140. The time at which data is stored may depend on a situation of the bus. When a format of data transferred from the internal memory 140 is different from a format of data stored in the external memory 190, the second format conversion unit 129 may be configured to change the format. The second format conversion unit 129 may perform the format of the data in a direction that is opposite to a direction in which a format conversion is performed by the first format conversion unit 127. The second format conversion unit 129 may include a floating point/fixed point computing unit. For example, the second format conversion unit 129 may change the format of the data based on IEEE 754-2008 (IEEE Standard for Floating-Point Arithmetic). The second format conversion unit 129 may support the format conversion of a floating-point, a single-to-half, a half-to-single, a single-to-double, a double-to-single, a floating-to-integer, an integer-to-floating, and so on.

Figure 4:
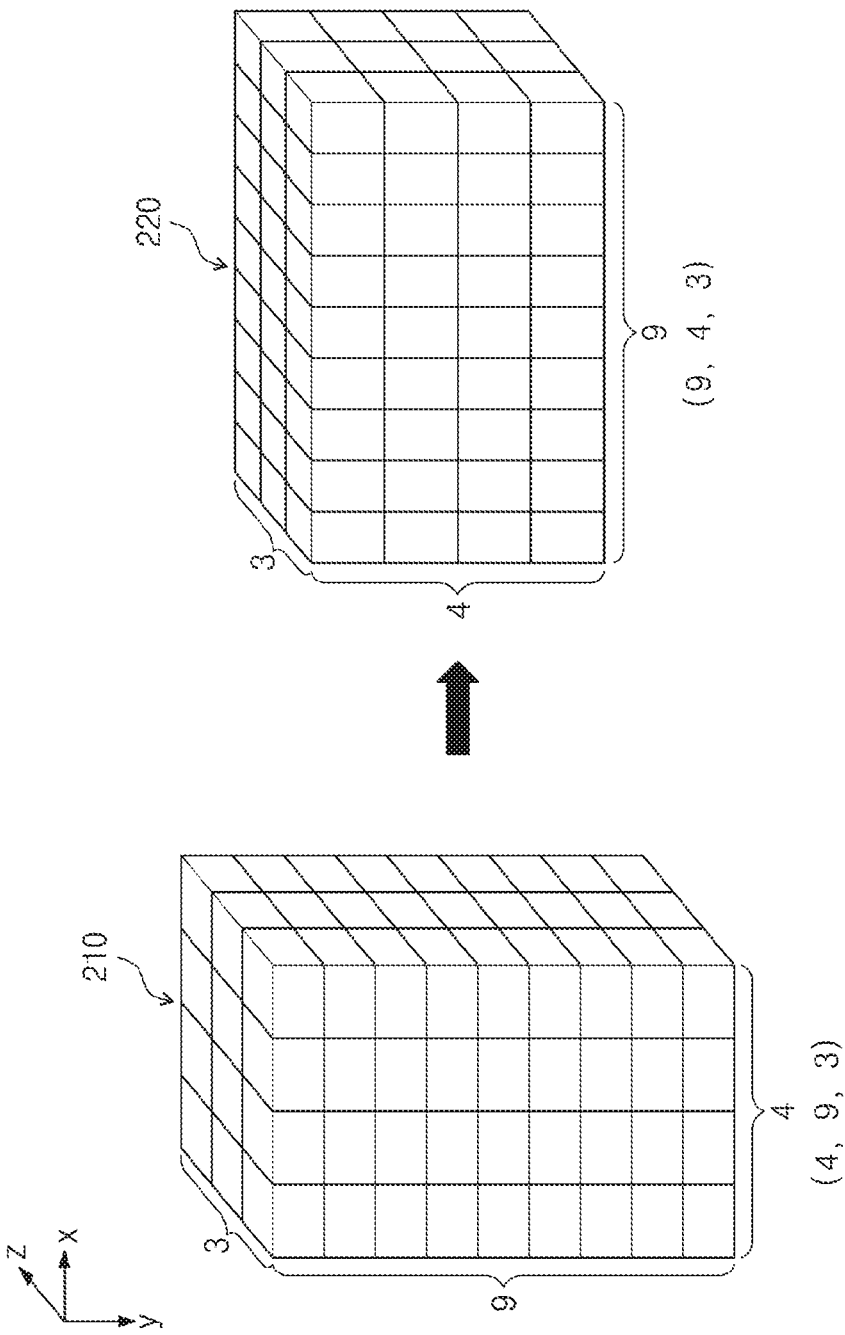
FIG. 4 is a diagram for describing reordering of multidimensional matrix data, which is performed by a data moving controller, according to an embodiment of the inventive concept.

FIG. 4 is a diagram for describing reordering of multidimensional matrix data, which is performed by a data moving controller, according to an embodiment of the inventive concept. Referring to FIG. 4, how to convert an order of a matrix dimension with regard to a three-dimensional matrix input is illustrated. The reordering of the multidimensional matrix data, that is, the dimension order conversion, is performed in the address generator 121 of FIG. 3. In detail, the dimension order conversion of the multidimensional matrix data may be performed through the first address generator 121*a* and the second address generator 121*b* that perform the operation of generating the physical addresses. In this case, it is assumed that the multidimensional matrix data are data which are converted from a first multidimensional array 210 to a second multidimensional array 220.

First, it is assumed that input data is transferred in the form of a first multidimensional array 210 from the external memory 190. It is assumed that the input data of the first multidimensional array 210 is provided in the form of a matrix of (x, y, z) which defines the number of data and an array order, and the matrix of (x, y, z) is to (4, 9, 3). The input data is required to be converted into a second multidimensional array 220 to be stored in the internal memory 140. In detail, the physical addresses on the internal memory 140, which corresponds to the input data, should be reordered as data array (x, y, z)=(9, 4, 3).

In the process of reordering the input data from the first multidimensional array 210 to the second multidimensional array 220, values or the size of the input data does not change, but data array directions are changed. When such a conversion is performed in the process of transferring input data from the external memory 190 to the internal memory 140, the first address generator 121*a* may set the multiple nested loops in the array of {(x, y, z)=(4,9,3)} and may generate the read address of the external memory 190 through at least three-stage loops. The second address generator 121*b* generates a physical address for a write operation associated with the internal memory 140 by setting the array of (y, x, z) to (4, 9, 3). That is, although the count value of the data is the same, the calculation order of the physical address may be changed from (x, y, z) to (y, x, z).

Figure 5:
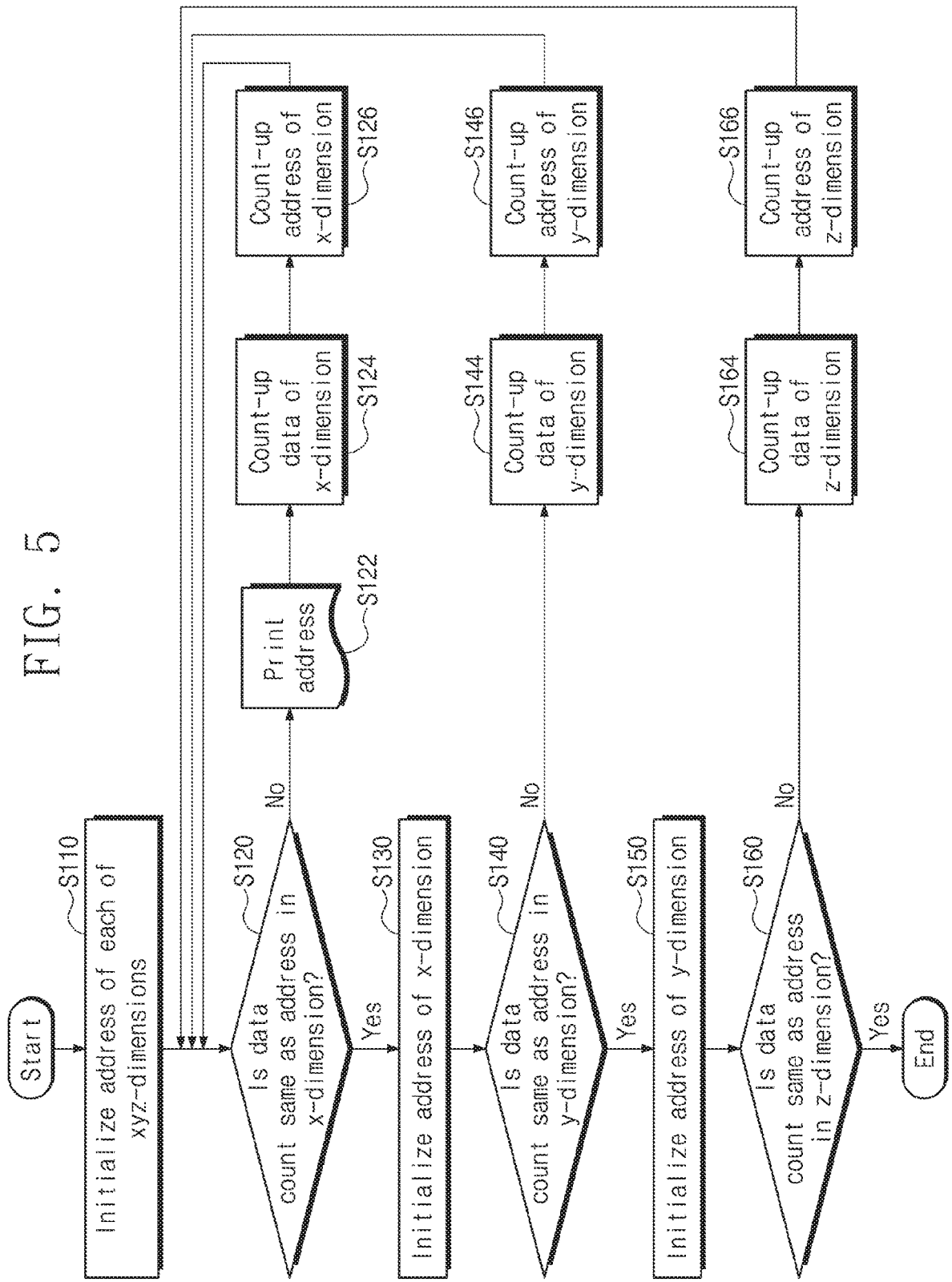
FIG. 5 is a flowchart illustrating a method in which an address generator of FIG. 3 generates physical addresses.

FIG. 5 is a flowchart illustrating a method in which an address generator of FIG. 3 generates physical addresses. For convenience of explanation, an input and an output of three-dimensional matrix data are assumed. Referring to FIG. 5, to generate an address for the input and the output of three-dimensional matrix data, the address generator 121 may combine physical addresses in the x, y, and z directions through a three-stage nested loops.

In operation S110, the address generator 121 initializes an address value of each of the dimensions of (x, y, z). For example, the address value of each dimension (x, y, z) may be initialized to an initial value (e.g., '0000' or '0001').

In operation S120, the address generator 121 compares a maximum data count with the address value in x-dimension. In this case, the maximum data count may mean the number of data allocated to each dimension. For example, in FIG. 4, the maximum data count of the x-dimension may be provided as '4'. When, in x-dimension, the maximum data count is different from the address value, operation S122 is performed. In contrast, when, in x-dimension, the maximum data count is the same as the address value, operation S130 is performed.

In operation S122, an address of the x-dimension may be printed. In some embodiments, the print of the address of the x-dimension may be omitted.

In operation S124, the address generator 121 may increase the data count of the x-dimension. To generate the address corresponding to a position of each data, the address generator 121 may increase the data count as the position of the data increases.

In operation S126, the address generator 121 may increase the address of x-dimension. When the increase for the address of the x-dimension is completed, the procedure returns to operation S120 to determine whether the address of the x-dimension is completely generated. In this case, operation S120, operation S122, operation S124, and operation S126 may form an x-dimensional address generation loop for generating the physical address which corresponds to the data count of the x-dimension.

In operation S130, the address generator 121 may initialize the address of the x-dimension for which the generation of the address is completed.

In operation S140, the address generator 121 may compare a maximum data count of a y-dimension with an address value of the y-dimension. In this case, the maximum data count may mean the number of data allocated to each dimension. When the maximum data count of the y-dimension is not same as the address value, the procedure transitions to operation S144. In contrast, when the maximum data count of the y-dimension is the same as the address value, the procedure transitions to operation S150.

In operation S144, the address generator 121 may increase a data count of the y-dimension. To generate the address corresponding to the position of each data, the address generator 121 may increase the data count as the position of the data increases.

In operation S146, the address generator 121 may increase the address of y-dimension. When the increase for the address of the y-dimension is completed, the procedure returns to operation S120 to determine whether the address of the xy-dimensions is completely generated.

In operation S150, the address generator 121 may initialize the address of the y-dimension for which the generation of the address is completed.

In operation S160, the address generator 121 may compare a maximum data count of a z-dimension with an address value of the z-dimension. In this case, the maximum data count may mean the number of data allocated to each dimension. When the maximum data count is not same as the address value, the procedure transitions to operation S164. In contrast, when the maximum data count of the z-dimension is the same as the address value, the procedure ends.

In operation S164, the address generator 121 may increases the data count of the z-dimension. To generate of the address corresponding to the position of each data, the address generator 121 may increase the data count as the data position increases.

In operation S166, the address generator 121 may increase the address of the z-dimension. When the increase for the address of the z-dimension is completed, the procedure returns to operation S120 to determine whether the address of the xyz-dimensions is completely generated.

A method of generating addresses of data which are arranged in a multidimensional matrix is described above. In this case, even though the three-stage nested loops for generating the addresses of three-dimensionally arranged data are described, but the inventive concept is not limited thereto. In other words, it will be appreciated that nested loops, the number of which is three or more, may be executed to generate the addresses of data which are arranged in the multidimensional matrix.

Figure 6:
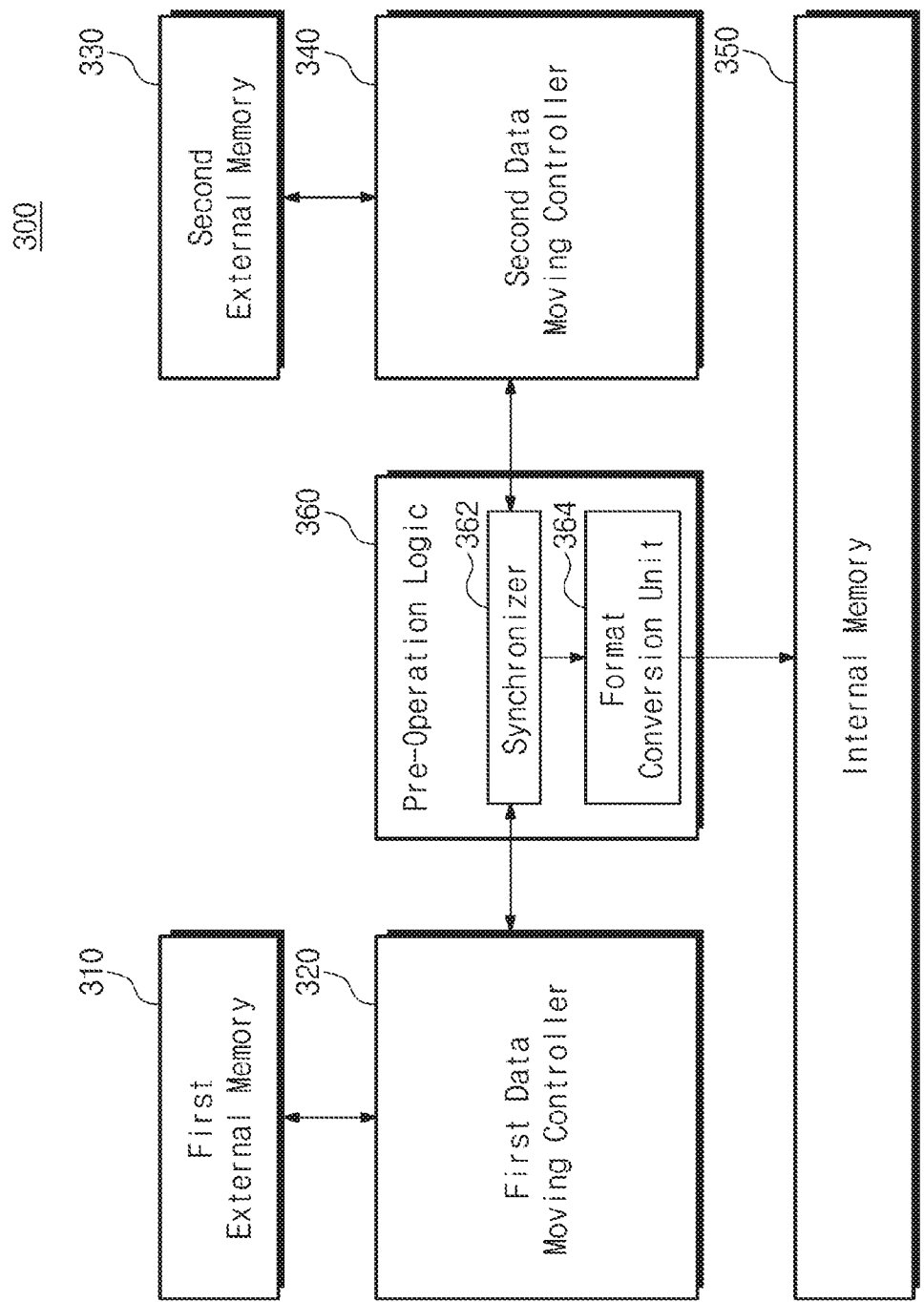
FIG. 6 is a block diagram illustrating a neural network system according to another embodiment of the inventive concept.

FIG. 6 is a block diagram illustrating a neural network system according to another embodiment of the inventive concept. Referring to FIG. 6, a neural network system 300 illustrates an embodiment including at least two data moving controllers 320 and 340. To secure a bandwidth of data for a neural network acceleration in the neural network system 300, a memory which has a plurality of input and output ports may be connected to a plurality of data moving controllers. In this embodiment, the neural network system 300 may reorder the dimension order of the multidimensional matrix data when data are transferring.

The data moving controllers 320 and 340 may respectively read data from corresponding external memories 310 and 330 and may write the read data into the internal memory 350. The neural network system 300 may further include pre-operation logic 360 for performing a data pre-processing function between the matrices in this process. The pre-operation logic 360 may perform matrix multiplication preprocessing between two matrices which are being transferred through the data moving controllers 320 and 340.

The pre-operation logic 360 may include a synchronizer 362 and a format conversion unit 364. The synchronizer 362 may adjust the order of data output from each of the data moving controllers 320 and 340. For matrix multiplication of the matrix input to the data moving controllers 320 and 340, and for accurate multiplication between matrix elements, the synchronizer 362 may adjust the order of the output data. The synchronizer 362 may check the operation status of the data moving controllers 320 and 340 to control the operation sequence of each of the data moving controllers 320 and 340 so that the data necessary for the matrix multiplication is output.

The format conversion unit 364 may perform floating point addition, multiplication, fixed point addition, multiplication, and the like for each input matrix configuration.

According to embodiments of the inventive concept, a controller for a neural network accelerator may improve an efficiency of data operation through multidimensional matrix processing, matrix reordering, and pre-processing operations.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. While the inventive concept has been described with reference to exemplary embodiments thereof, it will be apparent to those of ordinary skill in the art that various changes and modifications may be made thereto without departing from the spirit and scope of the present disclosure. Therefore, the scope of the present disclosure is not limited to the described embodiments but is defined by the claims and their equivalents.

What is claimed is:
1. A neural network system for processing data transferred from an external memory, comprising:
an internal memory configured to store input data transferred from the external memory;
an operator configured to perform a multidimensional matrix operation by using the input data of the internal memory and to transfer a result of the multidimensional array operation to the internal memory as output data; and a data moving controller configured to control an exchange of the input data or the output data between the external memory and the internal memory, wherein, for the multidimensional matrix operation, the data moving controller reorders a dimension order with respect to an access address of the external memory to generate an access address of the internal memory;

wherein the data moving controller is configured to:
  generate a first physical address for reading input data of a first multidimensional array from the external memory;
  generate a second physical address for storing the input data in the internal memory in a form of a second multidimensional array;
  generate a third physical address for reading output data of the second multidimensional array from the internal memory; and
  generate a fourth physical address for storing the output data of the second multidimensional array in the external memory in a form of the first multidimensional array.

2. The neural network system of claim 1, wherein the second multidimensional array is a data array in which the input data is the same as the input data of the first multidimensional array in size, and in which the dimension order is changed from a dimension order of the first multidimensional array.

3. The neural network system of claim 1, wherein the data moving controller generates the first physical address or the second physical address by using a multidimensional nested loop.

4. The neural network system of claim 1, wherein the data moving controller generates a protocol corresponding to an interface of the internal memory or an interface of the external memory, based on the first physical address or the second physical address.

5. The neural network system of claim 4, wherein the first physical address is an Advanced Extensible Interface (AXI) based memory address, and the second physical address corresponds to a Static Random Access Memory (SRAM) address.

6. The neural network system of claim 1, wherein the data moving controller comprises:
  an address generator configured to generate a first physical address for accessing the first external memory and a second physical address for accessing the internal memory;
  a first controller configured to read the input data from the external memory by using the first physical address; and
  a second controller configured to store the input data in the internal memory using the second physical address.

7. The neural network system of claim 6, wherein the first controller comprises:
  a first protocol generator configured to generate a protocol for communicating with the external memory by using the first physical address; and
  an input data buffer configured to store the input data transferred from the external memory.

8. The neural network system of claim 7, wherein the input data buffer comprises:
  a first format conversion unit configured to convert a data format of the input data into a data format of the internal memory.

9. The neural network system of claim 6, wherein the second controller comprises:
  a second protocol generator configured to generate a protocol for communicating with the internal memory by using the second physical address; and
  an output data buffer configured to store the output data transferred from the internal memory.

10. The neural network system of claim 9, wherein the output data buffer comprises:
  a second format conversion unit configured to convert a data format of the output data into a data format of the external memory.

11. A neural network system comprising:
  an internal memory configured to provide input data to a neural network operator or receive output data from the neural network operator;
  a first external memory configured to provide first matrix data to the internal memory;
  a first data moving controller configured to arbitrate a data transfer between the first external memory and the internal memory;
  a second external memory configured to provide second matrix data to the internal memory;
  a second data moving controller configured to arbitrate a data transfer between the second external memory and the internal memory; and
  pre-processing logic configured to control an output order of the first matrix data transferred from the first data moving controller and the second matrix data provided from the second data moving controller, and to transfer a result of controlling the output order to the internal memory;
  wherein the pre-processing logic comprises:
    a synchronizer configured to control the output order with reference to a state of the first data moving controller and a state of the second data moving controller; and
    a format conversion unit configured to convert a format of data output from the synchronizer and to transfer the converted format of the data to the internal memory.

* * * * *